US011527020B2

(12) United States Patent
Katsumata et al.

(10) Patent No.: US 11,527,020 B2
(45) Date of Patent: Dec. 13, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Takanori Katsumata, Tokyo (JP); Naohito Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/185,657

(22) Filed: Feb. 25, 2021

(65) Prior Publication Data

US 2021/0272329 A1 Sep. 2, 2021

(30) Foreign Application Priority Data

Feb. 27, 2020 (JP) .............................. JP2020-031845

(51) Int. Cl.
*G06T 11/00* (2006.01)
*G06T 7/62* (2017.01)
*G06T 7/70* (2017.01)

(52) U.S. Cl.
CPC ................ *G06T 11/00* (2013.01); *G06T 7/62* (2017.01); *G06T 7/70* (2017.01); *G06T 2200/24* (2013.01)

(58) Field of Classification Search
CPC ... G06T 11/00; G06T 7/62; G06T 7/70; G06T 2200/24
See application file for complete search history.

(56) References Cited

U.S. PATENT DOCUMENTS

| 9,939,914 | B2 * | 4/2018 | Fleishman | G06F 3/017 |
| 2014/0184641 | A1 * | 7/2014 | Naganawa | G09G 5/377 |
| | | | | 345/629 |
| 2015/0199850 | A1 * | 7/2015 | Uematsu | G06T 15/20 |
| | | | | 345/633 |
| 2015/0356788 | A1 * | 12/2015 | Abe | A63F 13/5255 |
| | | | | 345/633 |
| 2016/0133054 | A1 * | 5/2016 | Honjo | G06T 19/006 |
| | | | | 345/633 |
| 2019/0266337 | A1 * | 8/2019 | Sengupta | G06F 21/84 |
| 2021/0193084 | A1 * | 6/2021 | Deliz Centeno | G06F 3/04815 |

FOREIGN PATENT DOCUMENTS

JP          2006301924 A    11/2006

* cited by examiner

*Primary Examiner* — Samantha (Yuehan) Wang
(74) *Attorney, Agent, or Firm* — Canon U.S.A., Inc. IP Division

(57) ABSTRACT

An information processing apparatus includes a first acquisition unit configured to acquire a position and orientation of a display apparatus capable of displaying one or more virtual objects, a second acquisition unit configured to acquire a position and orientation of a target virtual object out of the one or more virtual objects, and a control unit configured to determine a method of displaying the target virtual object on the display apparatus based on the position and orientation of the display apparatus and the position and orientation of the target virtual object.

13 Claims, 10 Drawing Sheets

INFORMATION PROCESSING APPARATUS, INFORMATION PROCESSING METHOD, AND STORAGE MEDIUM

BACKGROUND

Field of the Disclosure

The present disclosure relates to an information processing technique of presenting a virtual object.

Description of the Related Art

A mixed reality (MR) technique has been known as a technique of merging real and virtual worlds in real time. This is a technique to merge a real space and a virtual space that is created by a computer in a seamless manner. This technique is expected to be applied to various fields, such as support for assembling by superimposing a work procedure at the time of performing an assembly work and support for surgery by superimposing an internal body state on a body surface of a patient.

In a case where a person who experiences the MR wears a head-mounted type display apparatus that provides a high sense of immersion, such as a head-mounted display (HMD), there is a possibility that the person who experiences the MR collides with another person who experiences the MR or collides with a real object. In view of the possibility, Japanese Patent Application Laid-Open No. 2006-301924 discusses a technique of obtaining a position and orientation of a viewpoint of a first user who experiences the MR and a position and orientation of a viewpoint of a second person who experiences the MR, and sending a notice, in a case where a distance between the first and second persons who experience the MR is smaller than a threshold, that the second person who experiences the MR is in proximity. In addition, Japanese Patent Application Laid-Open No. 2016-58042 discusses a technique of measuring a distance between a real object and a person who experiences MR and sending a notice that the real object and the user who experiences the MR are in proximity to each other.

However, with the techniques described above, one person who experiences the MR cannot predict the movement of, for example, a virtual object superimposed on a real object held by another person who experiences the MR. For this reason, there may be a case where the virtual object is abruptly displayed on a screen of a display apparatus worn by the person who experiences the MR (i.e., abruptly displayed before the eyes of the person who experiences the MR). In a case where the virtual object that moves irrespectively of the person's intention is displayed from an unexpected direction while the person is experiencing the MR, there is a possibility that the user who experiences the MR is unable to respond to and surprised by the display of the virtual object and the MR experience is inhibited.

SUMMARY

In view of the above issues, the present disclosure is directed to enabling prevention of inhibition of MR or the like due to, for example, proximity of a virtual object whose movement cannot be predicted by a person who experiences the MR.

According to an aspect of the present disclosure, an information processing apparatus includes a first acquisition unit configured to acquire a position and orientation of a display apparatus capable of displaying one or more virtual objects, a second acquisition unit configured to acquire a position and orientation of a target virtual object out of the one or more virtual objects, and a control unit configured to determine a method of displaying the target virtual object on the display apparatus based on the position and orientation of the display apparatus and the position and orientation of the target virtual object.

Further features of the present disclosure will become apparent from the following description of exemplary embodiments with reference to the attached drawings.

DESCRIPTION OF THE EMBODIMENTS

Exemplary embodiments will be described in detail below with reference to the accompanying drawings. Note that the following exemplary embodiments do not necessarily limit the present disclosure.

Figure 1:
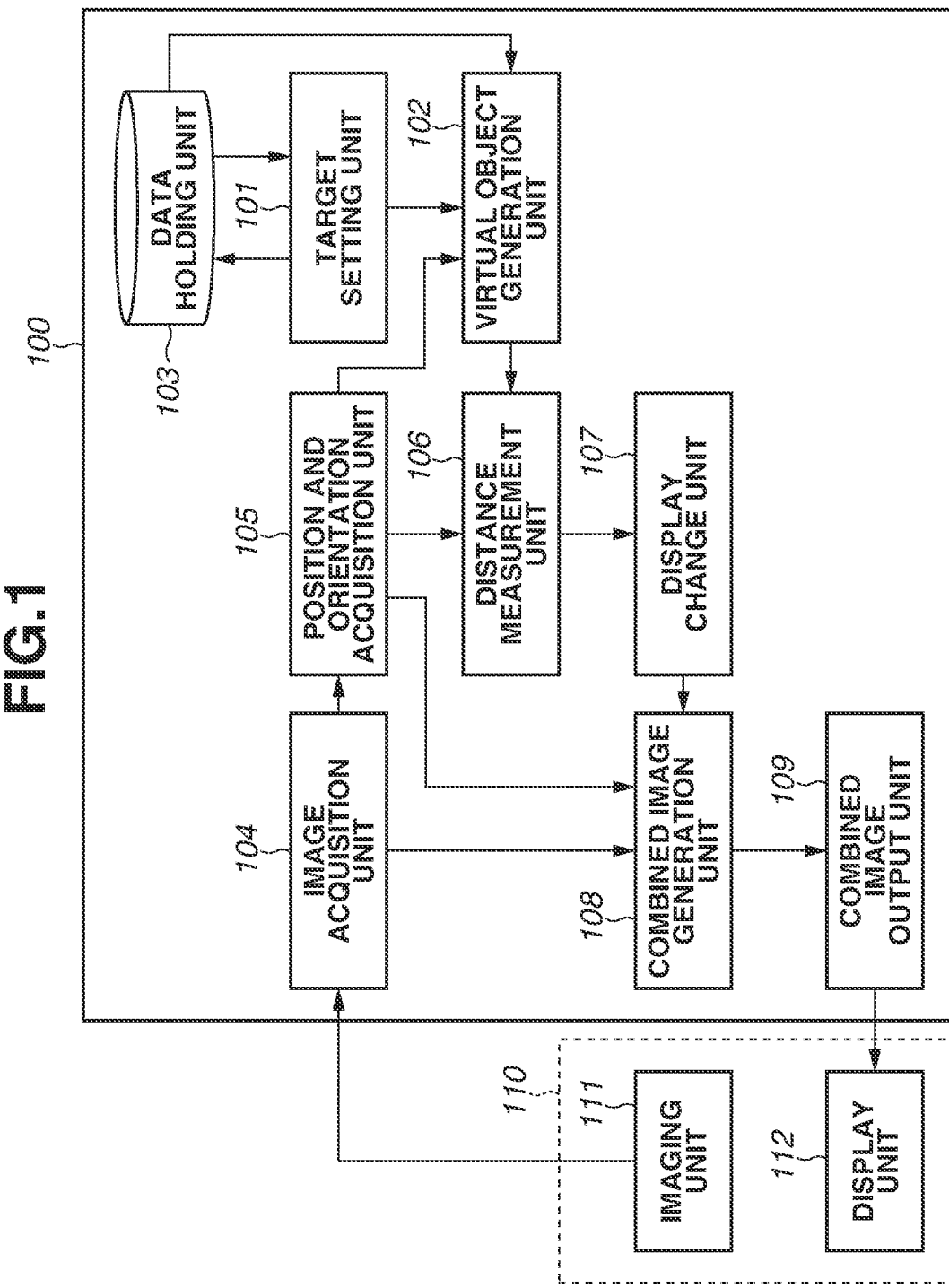
FIG. 1 is a block diagram illustrating an information processing apparatus according to one or more aspects of the present disclosure.

FIG. 1 is a block diagram illustrating an example of a functional configuration of an image processing apparatus according to a first exemplary embodiment.

An information processing apparatus 100 according to the present exemplary embodiment includes a target setting unit 101, a virtual object generation unit 102, a data holding unit 103, an image acquisition unit 104, a position and orientation acquisition unit 105, a distance measurement unit 106, a display change unit 107, a combined image generation unit 108, and a combined image output unit 109. In addition, the information processing apparatus 100 is connected in a wired or wireless manner to an imaging display apparatus 110, which is, for example, a head-mounted display (HMD).

The imaging display apparatus 110 is the HMD including an imaging unit 111 and a display unit 112, and is mounted on a head of a person who experiences mixed reality (MR). In the following description, a user who experiences the MR is referred to as an MR experiencing person, and a three-dimensional MR space that merges a real space and a virtual space and in which the MR experiencing person experiences the MR is referred to as an MR space. The imaging unit 111 is a video camera that images the real space corresponding to an orientation of the head (a line-of-sight direction) of the MR experiencing person. The imaging unit 111 transmits a captured image of the real space to the information processing apparatus 100. The display unit 112 is a display capable of displaying a combined image generated in and transmitted from the information processing apparatus 100 as described below. In this manner, an image taking direction of the imaging unit 111 is the line-of-sight direction of the MR experiencing user in the MR space, and an appearance in the MR space in the line-of-sight direction is displayed on the display unit 112.

In the information processing apparatus 100 according to the present exemplary embodiment, the data holding unit 103 holds data to constitute a plurality of virtual objects having possibilities of being displayed on the display unit 112 of the imaging display apparatus 110 (HMD) worn by the MR experiencing person.

The virtual object generation unit 102 acquires data to constitute a virtual object from the data holding unit 103 and generates the virtual object based on the data.

Note that the target setting unit 101, the distance measurement unit 106, and the display change unit 107 will be described below.

The position and orientation acquisition unit 105 acquires a position and orientation of the imaging display apparatus 110 in the three-dimensional real space. The position and orientation acquisition unit 105 may acquire the position of the imaging display apparatus 110 using a publicly known method. However, in the present exemplary embodiment, the position is acquired based on information obtained from a known index included in an image of the real space captured by the imaging unit 111. In the present exemplary embodiment, the known index is an index that is arranged in the real space and whose coordinates (position) in the real space are known. The position and orientation acquisition unit 105 acquires the position of the imaging display apparatus 110 based on the coordinates of the index extracted from each captured image of the real space in which the known index is arranged.

Figure 2:
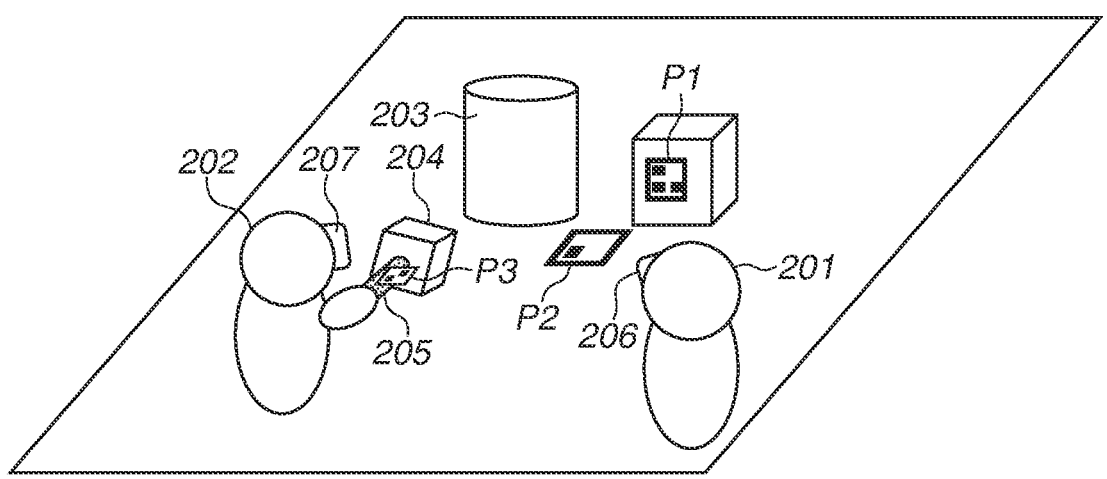
FIG. 2 is a diagram for describing a person who experiences mixed reality (MR), a real object, an index, and a virtual object.

In the present exemplary embodiment, the index used for acquiring the position of the imaging display apparatus 110 is, for example, an index in a quadrangle shape (hereinafter referred to as a quadrangle index P1) as illustrated in FIG. 2, and a plurality of quadrangle indexes P1 is arranged in the three-dimensional real space. FIG. 2 is a diagram to be used for describing each MR experiencing person, the real object, the index, and the virtual object, and a detailed description thereof will be given below. In the present exemplary embodiment, Pk (k=1, 2, 3, . . . , Ko) quadrangle indexes P1 are arranged in the three-dimensional real space, where Ko represents the number of arranged quadrangle indexes. Since a method of acquiring the position of the imaging display apparatus 110 based on a captured image of the index (quadrangle index) having such known coordinates is a publicly known, a detailed description thereof is omitted. While the quadrangle index P1 is described as an example in the present exemplary embodiment, the shape of the index used for acquiring the position of the imaging display apparatus 110 is not limited to the quadrangle. For example, the index may be an index in a planer shape or the like arranged on the floor, the wall, or the like in the real space such as an index P2 illustrated in FIG. 2, and may be any index that is detectable from the captured image of the real space. As Arrangement information (coordinate information) of the index in the real space, information created by a publicly known method may be used.

The position and orientation acquisition unit 105 acquires the orientation of the imaging display apparatus 110 based on, for example, an output of an orientation detection sensor, which is not illustrated, such as a gyro sensor included in the imaging display apparatus 110. Since a method of acquiring the orientation of the imaging display apparatus 110 based on the output of the orientation detection sensor is publicly known, a description thereof is omitted. The position and orientation acquisition unit 105 may acquire the orientation of the imaging display apparatus 110 based on the above-mentioned quadrangle index P1 or the like included in the image captured by the imaging display apparatus 110.

In addition to the above, for example, in a case where a position and orientation sensor is attached to the real object on which the virtual object is superimposed and displayed in the MR space, the position and orientation acquisition unit 105 can also acquire the position and orientation of the imaging display apparatus 110 and the position and orientation of the virtual object based on an output value of the position and orientation sensor. In this case, a relative positional relationship between the position and orientation sensor and the imaging unit 111 is calibrated in advance.

The combined image generation unit 108 combines the virtual object generated by the virtual object generation unit 102 with the image of the real space captured by the imaging unit 111 and acquired by the image acquisition unit 104, based on the position and orientation acquired by the position and orientation acquisition unit 105. Since processing of combining the image of the real space and the virtual object based on the position and orientation of the imaging display apparatus 110 is known processing, a detailed description thereof is omitted.

The combined image output unit 109 transmits a combined image, which is generated by the combined image generation unit 108 combining the virtual object with the image of the real space, to the display unit 112 of the imaging display apparatus 110. The display unit 112 of the imaging display apparatus 110 worn by the MR experiencing person displays the combined image generated by combining the virtual object with the real space, thereby presenting the MR to the MR experiencing person.

The present exemplary embodiment is to be described, using an example of a case where two persons experience the MR as illustrated in FIG. 2. FIG. 2 illustrates an example in which a virtual object 204 is superimposed on a real object 205 held by one MR experiencing person 202 out of two persons, an MR experiencing person 201 and the MR experiencing person 202. In the example illustrated in FIG. 2, the virtual object 203 is a virtual object whose position is fixed. Superimposing the virtual object 204 on the real object 205 held by the MR experiencing person 202 as illustrated in the example of FIG. 2, i.e., superimposing the virtual object on the real object moving in the real space, is achieved by associating the real object 205 with an index P3. The real object 205 is an object that can be carried by the MR experiencing person, and the index P3 is arranged on the real object 205. The virtual object 204 is brought into correspondence with the index P3. The combined image generation unit 108 identifies the position or the like at which the virtual object 204 should be displayed by recognizing the index P3 from the image captured by the imaging unit 111, and generates the combined image so as to superimpose the virtual object 204 on the captured image in the virtual space at a corresponding position. With this processing, the image in which the virtual object 204 is superimposed on the real object 205 held by the MR experiencing person is displayed on a screen of an HMD 206 of the MR experiencing person 201.

In the example of the MR experience as illustrated in FIG. 2, when the one MR experiencing person 202 moves the real object 205 held in his/her hand, the virtual object 204 superimposed on the real object 205 also moves together with the movement of the real object 205. Accordingly, since the virtual object 204 moves together with the movement of the hand of the MR experiencing person, it is difficult for the other MR experiencing person 201 to predict the movement of the virtual object 204, and thus the virtual object 204 may be abruptly displayed before the eyes of the MR experiencing person 201. In this case, the MR experiencing person 201 may be unable to respond to and surprised by the virtual object 204 abruptly displayed before the eyes, and the MR experience may be inhibited.

The information processing apparatus 100 according to the present exemplary embodiment performs information processing to be described blow to enable prevention of inhibition of the MR experience or the like due to, for example, proximity of the virtual object whose movement cannot be predicted by the MR experiencing person by himself/herself as described above. A description will be given using an example of information processing performed in the information processing apparatus 100 to output the combined image to the imaging display apparatus 110 (HMD 206) worn by the MR experiencing person 201 in the example of the MR experience as illustrated in FIG. 2. In the example illustrated in FIG. 2, the imaging display apparatus 110 worn by the other MR experiencing person 202 is an HMD 207, and a description of processing to be performed by the information processing apparatus 100 when outputting the combined image to the HMD 207 of the other MR experiencing person 202 is omitted.

In the present exemplary embodiment, the target setting unit 101 sets an attribute for a measurement target to a virtual object set as a measurement target (hereinafter referred to as a measurement target virtual object) out of virtual objects displayed on the HMD 206 (the imaging display apparatus 110) of the MR experiencing person 201. The measurement target virtual object is a virtual object having a possibility that the MR experiencing user 201 cannot predict its movement, i.e., a virtual object having a possibility of being displayed abruptly before the eyes of the MR experiencing person 201 in the example illustrated in FIG. 2. Examples of the virtual object having the possibility that the MR experiencing user 201 cannot predict its movement include the virtual object 204 that is superimposed on the real object 205 held by the other MR experiencing person 202 in hand as described above. For this reason, the target setting unit 101 sets the virtual object 204 superimposed on the real object 205 held by the other MR experiencing person 202 in hand as the measurement target virtual object. The measurement target virtual object is, however, not limited to the object held in hand and moved by the other MR experiencing person 202. The measurement target virtual object may be, for example, a virtual object such as an avatar displayed in step with the movement of the entire body or part of the body of the other MR experiencing person 202, or a virtual object that moves in the MR space based on a rule irrespective of the movement of the other MR experiencing person 202. For example, even in a case where the target object itself does not move, the virtual object that exists in the surroundings of a path in which the MR experiencing person 201 can move and that has a possibility of suddenly emerging before the eyes of the MR experiencing person 201 depending on how his/her line-of-sight moves may be set as the measurement target object.

In the present exemplary embodiment, a user such as the MR experiencing person can designate the measurement target virtual object. In this case, the target setting unit 101 sets the virtual object designated by the user via a graphical user interface (GUI) as the measurement target virtual object. Alternatively, the target setting unit 101 can automatically set a virtual object having an area having a size larger than or equal to a predetermined size as the measurement target virtual object.

In the first exemplary embodiment, the measurement target virtual object is a virtual object, a distance between which and the HMD 206 worn by the MR experiencing person 201 in the MR space is to be measured. While a description is given of the example of measuring the distance in the first exemplary embodiment, the measurement with respect to the measurement target virtual object is not limited to the measurement of the distance. The measurement with respect to the measurement target virtual object, which will be described below in detail in another exemplary embodiment, may be measurement of an angle between an image taking direction of the HMD 206 and a moving direction of the virtual object, measurement of a relative speed between the HMD 206 and the virtual object, an occupied area ratio of the virtual object to a screen, or the like.

In the information processing apparatus 100 of the present exemplary embodiment, the target setting unit 101 sets the attribute for the measurement target to data of the measurement target virtual object as described below.

Figure 3:
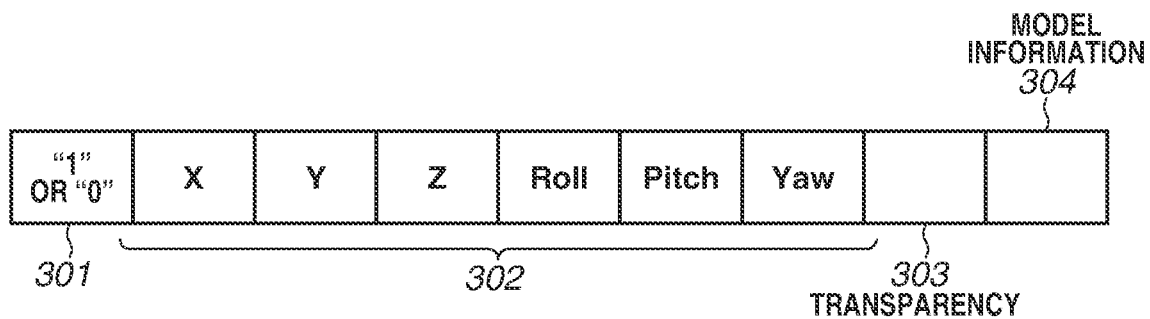
FIG. 3 is a diagram illustrating an example of a data configuration of one virtual object.

FIG. 3 is a diagram illustrating an example of a data configuration of one virtual object. In the present exemplary embodiment, the data configuration of the virtual object includes position and orientation information 302 indicating the position (x, y, and z coordinates) and orientation (rolling, pitching, and yawing) of the virtual object in the three-dimensional space, and model information 304 indicating visual information such as a color and shape of the virtual object. In the present exemplary embodiment, the information indicating the attribute for the measurement target includes, in addition to these pieces of information, a measurement target flag 301 indicating whether the virtual object is the measurement target virtual object, and transparency 303. The measurement target flag 301 is information represented by one bit whose value is "1" or "0". A value of the measurement target flag 301 being "1" indicates that the virtual object is the measurement target virtual object (ON). A value of the measurement target flag 301 being "0" indicates that the virtual object is not the measurement target virtual object (OFF). The transparency 303 is information representing a degree of transparency of an image of the virtual object when the image of the virtual object is combined with the image of the real space by the combined image generation unit 108. In the present exemplary embodiment, an initial setting of the measurement target flag 301 is "0", and an initial setting of the transparency 303 is zero transparency (i.e., opacity). The target setting unit 101 sets the value of the measurement target flag 301 to "1" with respect to the measurement target virtual object.

The virtual object generation unit 102 acquires data about the virtual object to be displayed on the HMD 206 of the MR experiencing person 201 illustrated in FIG. 2. In the example illustrated in FIG. 2, the virtual object to be displayed on the HMD 206 of the MR experiencing person 201 includes the stationary virtual object 203 arranged in the MR space, and the virtual object 204 superimposed on the real object 205 held by the MR experiencing person 202 in hand. In the example illustrated in FIG. 2, the virtual object 204 is the measurement target virtual object in which the value of the measurement target flag 301 is set to "1" by the target setting unit 101, while the virtual object 203 is a virtual object in which the value of the measurement target flag 301 is set to "0". The virtual object generation unit 102 then generates the virtual object 203 and the virtual object (measurement target virtual object) 204 as the virtual object to be displayed on the HMD 206 of the MR experiencing person 201. Furthermore, the virtual object generation unit 102 determines a position at which the generated virtual object is arranged in the MR space. In the present exemplary embodiment, the virtual object generation unit 102 determines a coordinate position at which each virtual object should be arranged in the MR space based on the position of the index acquired by the position and orientation acquisition unit 105 from the captured image of the real space.

In addition, the position and orientation acquisition unit 105 acquires the position and orientation of the HMD 206 worn by the MR experiencing person 201 as described above, and transmits information about the position and orientation to the distance measurement unit 106.

The distance measurement unit 106 recognizes the position of the HMD 206 worn by the MR experiencing person 201 in the three-dimensional real space based on the position and orientation information supplied from the position and orientation acquisition unit 105. Further, the distance measurement unit 106 identifies the measurement target virtual object 204 based on the value ("1") of the measurement target flag 301 indicating the afore-mentioned attribute for the measurement target, and also recognizes the position at which the measurement target virtual object 204 is displayed in the MR space. Furthermore, the distance measurement unit 106 calculates a distance between the measurement target virtual object 204 and the HMD 206 of the MR experiencing person 201. In a case where the distance between the measurement target virtual object 204 and the HMD 206 becomes smaller than or equal to a predetermined distance threshold, the distance measurement unit 106 notifies the display change unit 107 that the distance between the measurement target virtual object 204 and the HMD 206 becomes smaller than or equal to the predetermined distance threshold.

Upon reception of the notification that the distance between the measurement target virtual object 204 and the HMD 206 becomes smaller than or equal to the distance threshold, the display change unit 107 performs control to change a method of displaying the measurement target virtual object 204. The change of the display method mentioned herein means a change of an appearance. As the control to change the method of displaying the measurement target virtual object 204, the display change unit 107, for example, changes the transparency 303 of the measurement target virtual object 204 to, for example, a maximum value. The change of the method of displaying the measurement target virtual object 204 is not limited to the case of changing the transparency 303 of the measurement target virtual object 204 to the maximum value (i.e., a case of hiding the measurement target virtual object 204), and may be a change of the transparency 303 to another value, for example, such a value as not to inhibit the MR experience of the MR experiencing person. In addition, the change of the display method is not limited to the change of the transparency. The change of the display method by adjustment of a color and saturation or animation effect instead of the change of the transparency or in combination with the change of the transparency may be utilized.

The combined image generation unit 108 generates a combined image by combining the measurement target virtual object 204, the virtual object 203, or the like, with the captured image of the real space supplied from the image acquisition unit 104. The measurement target virtual object 204 is a virtual object, the display method of which is to be changed by the display change unit 107. The virtual object 203 is not set as the measurement target. For example, in a case where the transparency 303 of the measurement target virtual object 204 is set to be the maximum value, the combined image generation unit 108, at the time of image combination processing, makes an image of the measurement target virtual object 204 transparent, thereby hiding the measurement target virtual object 204 on the HMD 206 of the MR experiencing person 201. In other words, in a case where the movement of the hand of the MR experiencing person 202 or the like causes the virtual object 204 serving as the measurement target virtual object to move before the eyes of the MR experiencing person 201, the virtual object 204 is hidden on the HMD 206 of the MR experiencing person 201. This prevents the virtual object 204 from being displayed before the eyes of the MR experiencing person 201, and also prevents the MR experience of the MR experiencing person 201 from being inhibited. Since the measurement target virtual object, a distance from which to the HMD 206 is larger than the predetermined distance threshold, and another virtual object that has not been set as the measurement target virtual object still have zero transparency, images of these objects are displayed on the HMD 206.

Figure 4:
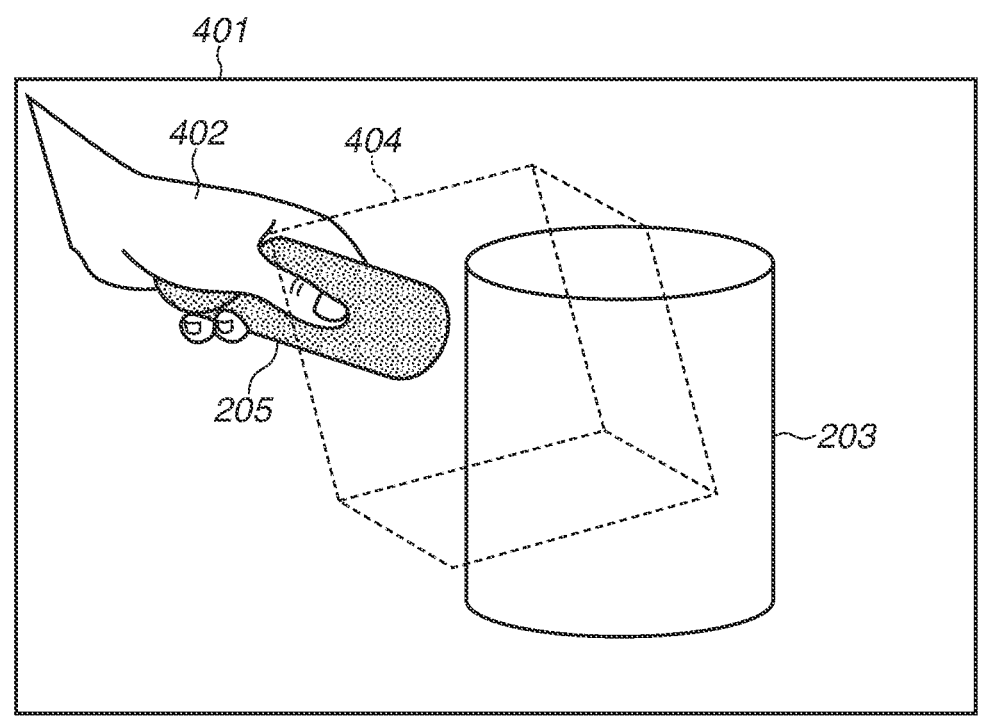
FIG. 4 is a diagram illustrating an example of display in a case where a method of displaying a virtual object has been changed.

FIG. 4 is a diagram illustrating an example of a video image 401 displayed on the HMD 206 of the MR experiencing person 201 in a case where the measurement target virtual object 204 is made transparent. A hand 402 in the video image 401 is a hand of the MR experiencing person 202 and is gripping the real object 205. The real object 205 in the video image 401 is the real object 205 described above with reference to FIG. 2. In addition, a portion 404 indicated by dotted lines in FIG. 4 corresponds to the virtual object 204 illustrated in FIG. 2 and represents a state in which the virtual object 204 is hidden (a transparent state) due to the transparency being set to the maximum value in this example. The virtual object 203 is not the measurement target virtual object and thus is displayed. In this manner, since the virtual object 204 is not displayed on the HMD 206 of the MR experiencing person 201 at a timing that is unexpected for the MR experiencing person 201, the MR experience of the MR experiencing person 201 is not inhibited.

Figure 5:
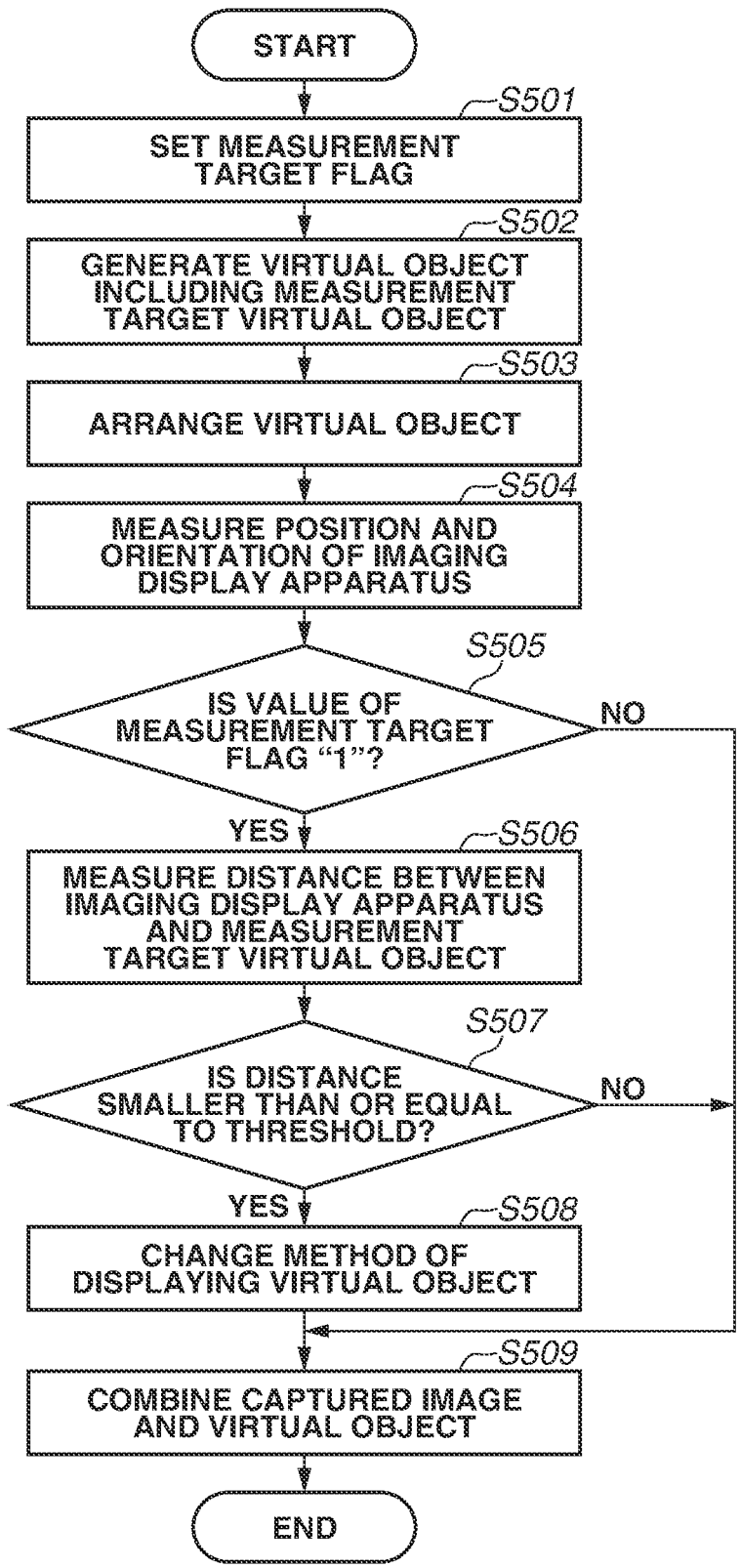
FIG. 5 is a flowchart describing a flow of information processing according to one or more aspects of the present disclosure.

FIG. 5 is a flowchart describing a flow of the information processing described above and to be performed by the information processing apparatus 100 according to the present exemplary embodiment. An operation of the information processing apparatus 100 according to the present exemplary embodiment is described below with reference to the flowchart in FIG. 5.

In step S501, the target setting unit 101 sets the measurement target virtual object. Data about the virtual object serving as a setting target is held by the data holding unit 103 as described above. Thus, for example, if the MR experiencing person gives an instruction to a button or the like on a GUI, which is not illustrated, to select the virtual object, the target setting unit 101 sets the selected virtual object as the measurement target virtual object. In addition, the measurement target flag is set by, for example, the MR experiencing person switching the value of the flag in a list box prepared on a GUI, which is not illustrated.

In step S502, the virtual object generation unit 102 generates the virtual object that is set as the measurement target virtual object in step S501 and the virtual object that is not set as the measurement target virtual object. For example, in response to input of an instruction for generating the virtual object by the MR experiencing person via a GUI such as a model creation button, which is not illustrated, the virtual object generation unit 102 acquires data from the data holding unit 103 and generates each virtual object.

In step S503, the virtual object generation unit 102 arranges the virtual object generated in step S502 in the MR space. In the present exemplary embodiment, the virtual object generation unit 102 determines a coordinate position at which each virtual object should be arranged in the MR space based on the position of the index for acquiring the position such as the quadrangle index detected from the captured image of the real space as described above, and then arranges each virtual object at the determined position.

Subsequently in step S504, the position and orientation acquisition unit 105 measures the position and orientation of the imaging display apparatus 110 (HMD) by a publicly known method. The position and orientation acquisition unit 105 may acquire the position and orientation information using any publicly known method. For example, as described above, the position and orientation acquisition unit 105 acquires the position and orientation of the imaging display apparatus 110 based on the position of the known index detected from the captured image of the real space. In addition, the position and orientation acquisition unit 105 also calculates the position and orientation of the measurement target virtual object based on the index detected from the captured image of the real space, and transmits these pieces of information to the distance measurement unit 106 and the combined image generation unit 108.

In step S505, the distance measurement unit 106 determines whether an attribute of the virtual object generated in step S502 indicates the measurement target virtual object. As described in step S502, whether or not the virtual object is the measurement target virtual object is set with the value of the measurement target flag. In step S505, the distance measurement unit 106 determines whether or not the value of the measurement target flag is "1". In a case where the value of the measurement target flag is "1" (YES in step S505), the processing proceeds to step S506. In a case where the value of the measurement target flag is not "1" (i.e., in a case of "0")(NO in step S505), the processing proceeds to step S509.

In step S506, the distance measurement unit 106 measures the distance between the measurement target virtual object and the imaging display apparatus 110 in the MR space based on the position of the measurement target virtual object acquired in step S503 and the position of the imaging display apparatus 110 acquired in step S504.

In subsequent step S507, the distance measurement unit 106 determines whether the distance between the measurement target virtual object and the imaging display apparatus 110 is smaller than or equal to the predetermined distance threshold. In a case where the distance between the measurement target virtual object and the imaging display apparatus 110 is smaller than or equal to the predetermined distance threshold (YES in step S507), the processing proceeds to step S508. In contrast, in a case where the distance between the measurement target virtual object and the imaging display apparatus 110 is larger than the predetermined distance threshold (NO in step S507), the processing proceeds to step S509. The distance threshold may be determined by, for example, presenting a GUI, which is not illustrated, to cause the MR experiencing person to input the distance threshold, or may be determined in advance. A plurality of distance thresholds may be set. For example, in a case where a first distance threshold and a second distance threshold that is smaller than the first distance threshold are set, the distance measurement unit 106 may notify the display change unit 107 when the distance to the measurement target virtual object becomes smaller than or equal to the first distance threshold, and subsequently when the distance to the measurement target virtual object becomes smaller than or equal to the second distance threshold.

In step S508, the display change unit 107 performs control to change a display of the measurement target virtual object in the combined image generation unit 108. The combined image generation unit 108 at this time sets the transparency of the measurement target virtual object to, for example, the maximum value, or such a value as not to inhibit the MR experience of the MR experiencing person. In such a case where the plurality of distance thresholds is set in the distance measurement unit 106, the display change unit 107 may change the display method every time the distance to the measurement target virtual object becomes smaller than or equal to each distance threshold. For example, the display change unit 107 may change the display method in stages in accordance with the distance so as to change the display method to a first display method when being notified that the distance has become smaller than or equal to the first distance threshold, and thereafter change the display method to a second display method when being notified that the distance has become smaller than or equal to the second distance threshold.

In step S509, the combined image generation unit 108 generates the combined image by combining the captured image acquired in the image acquisition unit 104 and the image of each virtual object including the measurement target virtual object. The combined image generation unit 108 then transmits the combined image to the combined image output unit 109, and the combined image output unit 109 transmits the combined image to the display unit 112 of the imaging display apparatus 110.

As described above, in the information processing apparatus 100 according to the present exemplary embodiment, the measurement target flag is set to each virtual object, and the display method is changed in a case where the virtual object set as the measurement target virtual object is in proximity with the HMD of the MR experiencing person. That is, according to the present exemplary embodiment, automatically changing how the measurement target virtual object looks in a case where the measurement target virtual object is in proximity with the HMD of the MR experiencing person enables prevention of, for example, inhibition of the MR experience by the virtual object whose movement cannot be predicted by the MR experiencing person by himself/herself.

In a second exemplary embodiment, an example of changing the method of displaying the measurement target virtual object based on information different from the distance between the imaging display apparatus 110 and the measurement target virtual object 204 is to be described.

Figure 6:
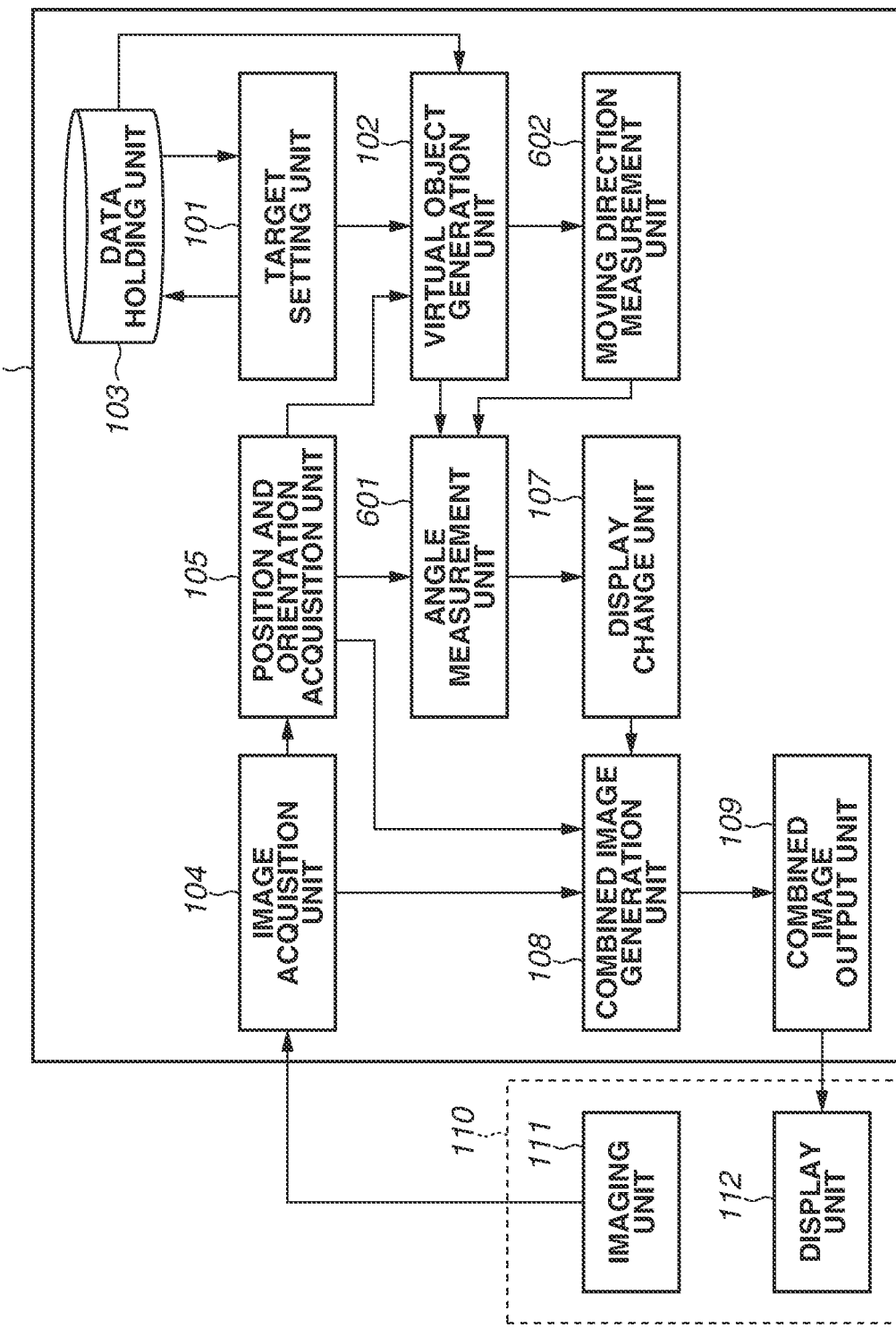
FIG. 6 is a block diagram illustrating an image processing apparatus according to one or more aspects of the present disclosure.

FIG. 6 is a diagram illustrating an example of a configuration of an information processing apparatus 600 and the imaging display apparatus 110 according to the second exemplary embodiment. In FIG. 6, the same constituent elements as those illustrated in FIG. 1 are denoted by the same reference signs as those illustrated in FIG. 1, and a detailed description thereof is omitted. In addition, the second exemplary embodiment is to be described, also using the example of the MR experience described with reference to FIG. 2.

In the second exemplary embodiment, the position and orientation acquisition unit 105 acquires the image taking direction of the imaging unit 111 of the imaging display apparatus 110, and transmits information about the image taking direction to an angle measurement unit 601. As described above, the image taking direction of the imaging unit 111 is the line-of-sight direction of the MR experiencing person in the MR space, and an appearance in the MR space that can be seen from the MR experiencing person in the line-of-sight direction is displayed on the display unit 112. For this reason, the image taking direction of the imaging unit 111 in the MR space and a display direction of the imaging unit 111 in the MR space are the same as each other.

A moving direction measurement unit 602 calculates a moving direction of the measurement target virtual object 204 from a difference between the position of the measurement target virtual object 204 in a previous frame and the position of the measurement target virtual object 204 in a current frame. The moving direction measurement unit 602 then adds the attribute for the measurement target including information about the moving direction to data about the measurement target virtual object 204, and transmits the data to the angle measurement unit 601.

The angle measurement unit 601 calculates an angle between the image taking direction of the imaging unit 111 in the MR space (the display direction of the display unit 112 in the MR space) and the moving direction of the measurement target virtual object. In other words, the angle measurement unit 601 calculates an angle at an intersection point (a crossing angle) formed between two lines representing two directions of the image taking direction and the moving direction. In a case where the angle at the intersection point is smaller than or equal to a predetermined angle threshold, the angle measurement unit 601 notifies the display change unit 107 that the angle at the intersection point is smaller than or equal to a predetermined angle threshold. The angle at the intersection point between the image taking direction and the moving direction mentioned herein represents an angle between the line-of-sight direction of the MR experiencing person 201 and the moving direction of the virtual object coming toward the line-of-sight direction. For this reason, the smaller the angle at the intersection point is, the higher a possibility that the virtual object appears before the eyes of the MR experiencing person 201 as a result of the movement of the virtual object. In other words, in a case where the angle at the intersection point is small, it can be said that there is a high possibility of emergence of the virtual object before the eyes of the MR experiencing person 201 due to the movement of the virtual object. For this reason, in the second present exemplary embodiment, in a case where the angle at the intersection point between the image taking direction and the moving direction is smaller than or equal to the predetermined angle threshold, the angle measurement unit 601 notifies the display change unit 107 that the angle at the intersection point between the image taking direction and the moving direction is smaller than or equal to the predetermined angle threshold.

Upon reception of the notification, the display change unit 107 of the second exemplary embodiment then changes the method of displaying the measurement target virtual object 204 in the combined image generation unit 108. The change of the display method is similar to that of the example of the first exemplary embodiment.

Figure 7:
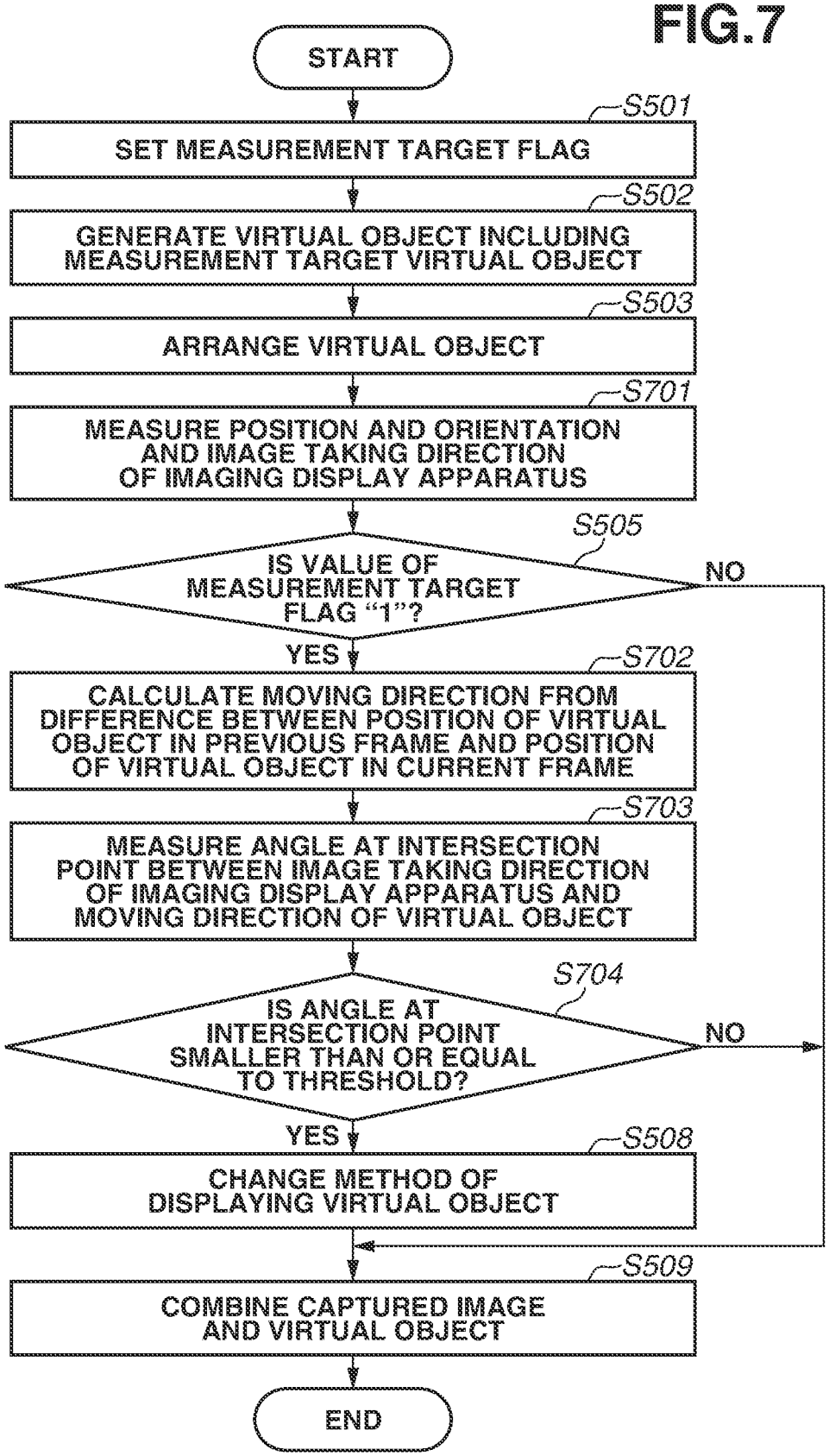
FIG. 7 is a flowchart describing a flow of information processing according to one or more aspects of the present disclosure.

FIG. 7 is a flowchart describing a flow of information processing to be performed by the information processing apparatus 100 according to the second exemplary embodiment. In the flowchart of FIG. 7, the same processing steps as those in the flowchart of FIG. 5 described above are denoted by the same reference signs as those in FIG. 5, and a description thereof is omitted as appropriate. The processing from step S501 to step S503 is similar to that described above. In the second exemplary embodiment, after the processing in step S503, the processing proceeds to step S701.

In step S701, the position and orientation acquisition unit 105 acquires the position and orientation and the image taking direction of the imaging display apparatus 110 in a similar manner to that described above, and transmits these pieces of information to the angle measurement unit 601 and the combined image generation unit 108. After step S701, the processing to be performed by the information processing apparatus 600 proceeds to the processing in step S505. In step S505, similarly to the first exemplary embodiment, the distance measurement unit 106 determines whether or not the value of the measurement target flag is "1". In a case where the value of the measurement target flag is not "1" (NO in step S505), the processing proceeds to step S509. In contrast, in a case where the value of the measurement target flag is "1" (YES in step S505), the processing proceeds to step S702.

In step S702, the moving direction measurement unit 602 calculates the moving direction from the difference between the position of the measurement target virtual object in a previous frame and the position of the measurement target virtual object in a current frame, adds the attribute for the measurement target including the information about the moving direction to the data about the measurement target virtual object, and transmits the data to the angle measurement unit 601.

Subsequently in step S703, the angle measurement unit 601 calculates the angle at the intersection point between two directions, which are the image taking direction of the imaging display apparatus 110 acquired in step S701 and the moving direction of the measurement target virtual object acquired in step S702.

Subsequently in step S704, the angle measurement unit 601 determines whether or not the angle acquired in step S703 is smaller than or equal to the predetermined angle threshold. In a case where the angle measurement unit 601 determines that the angle at the intersection point is not smaller than or equal to the predetermined angle threshold (larger than the angle threshold) (NO in step S704), the processing to be performed by the information processing apparatus 600 proceeds to step S509. In contrast, in a case where the angle measurement unit 601 determines that the angle at the intersection point is smaller than or equal to the predetermined angle threshold (YES in step S704), the angle measurement unit 601 notifies the display change unit 107 that the angle at the intersection point is smaller than or equal to the predetermined angle threshold, and thereafter the processing to be performed by the information processing apparatus 600 proceeds to step S508. The processing in steps S508 and S509 is similar to that described above.

As described above, in the second exemplary embodiment, the display direction of the virtual object coming toward the MR experiencing person in the line-of-sight direction is changed based on the angle at the intersection point between the image taking direction (the line-of-sight direction of the MR experiencing person) and the moving direction of the measurement target virtual object. With this configuration, according to the second exemplary embodiment, the MR experience can be prevented from being inhibited by the virtual object whose movement cannot be predicted by the MR experiencing person by himself/herself.

Modification Example of Second Exemplary Embodiment

While the example of determining whether or not to change the method of displaying the virtual object based on the angle at the intersection point between the image taking direction and the moving direction has been described, a relative speed between the imaging display apparatus 110 and the measurement target virtual object 204 may be added to a condition for determining whether or not to change the display method, as a modification example.

In this modification example, the moving direction measurement unit 602 calculates a moving direction and a moving speed from a change of the position of the measurement target virtual object 204, that is, for example, the difference between the position of the measurement target virtual object in the previous frame and the position of the measurement target virtual object in the current frame. The moving direction measurement unit 602 then adds the attribute for the measurement target including information about the moving direction and moving speed to the data about the measurement target virtual object 204, and transmits the data to the angle measurement unit 601.

In addition, the angle measurement unit 601 calculates the angle at the intersection point between two directions, which are the image taking direction and the moving direction of the measurement target virtual object, in a similar manner to that described above, and also calculates a moving speed of the imaging display apparatus 110 from the difference between the position of the imaging display apparatus 110 in the previous frame and the position of the imaging display apparatus 110 in the current frame. Furthermore, the angle measurement unit 601 calculates the relative speed between the measurement target virtual object 204 and the imaging display apparatus 110 based on the moving direction and moving speed of the measurement target virtual object 204 and the image taking direction and moving speed of the imaging display apparatus 110. In a case where the angle at the intersection point is smaller than or equal to the predetermined angle threshold described above and the relative speed is higher than or equal to the predetermined speed threshold, the angle measurement unit 601 notifies the display change unit 107 that the angle at the intersection point is smaller than or equal to the predetermined angle threshold and that the relative speed is higher than or equal to the predetermined speed threshold. Upon reception of the notification, the display change unit 107 changes the method of displaying the measurement target virtual object 204 in a similar manner to that described above.

According to the modification example of the second exemplary embodiment, in a case where the virtual object, which comes from a direction with which the line-of-sight direction of the MR experiencing person forms an angle that is smaller than or equal to the predetermined angle threshold, approaches at a speed that is higher than or equal to the predetermined speed threshold, the method of displaying the virtual object can be changed. With this configuration, also according to the modification example of the second exemplary embodiment, the MR experience can be prevented from being inhibited by the virtual object whose movement cannot be predicted by the MR experiencing person by himself/herself.

In the modification example of the second exemplary embodiment, even if the virtual object comes from a direction, with which the line-of-sight direction of the MR experiencing person forms an angle that is smaller than or equal to the predetermined angle threshold, the method of displaying the virtual object is not changed if its approach speed is below the predetermined speed threshold. That is, in the case of the virtual object whose approach speed is low, the MR experiencing person easily predicts the movement of the virtual object by himself/herself, and it is unlikely that the virtual object inhibits the MR experience. Therefore, the method of displaying the virtual object whose approach speed is below the predetermined speed threshold is not changed.

In a third exemplary embodiment, an example of changing the method of displaying the measurement target virtual object based on an occupied area ratio of the measurement target virtual object to the screen of the HMD of the MR experiencing person is to be described.

Figure 8:
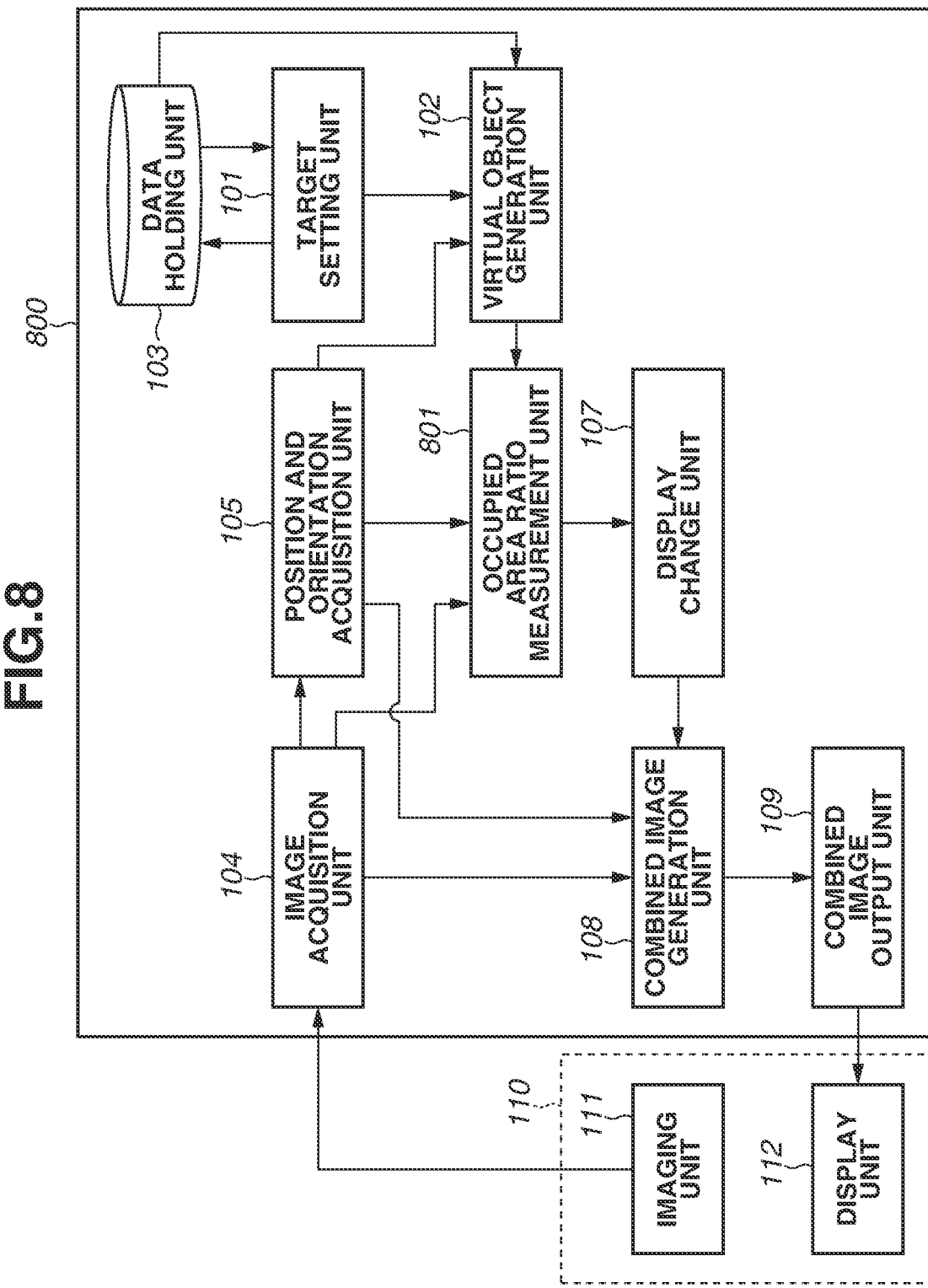
FIG. 8 is a block diagram illustrating an image processing apparatus according to one or more aspects of the present disclosure.

FIG. 8 is a diagram illustrating an example of a configuration of an information processing apparatus 800 and the imaging display apparatus 110 according to the third exemplary embodiment. In FIG. 8, the same constituent elements as those illustrated in FIG. 1 are denoted by the same reference signs as those illustrated in FIG. 1, and a detailed description thereof is omitted. In addition, the third exemplary embodiment is to be described, also using the example of MR experience described above with reference to FIG. 2.

In the information processing apparatus 800 according to the third exemplary embodiment, the image acquisition unit 104 transmits a captured image acquired from the imaging unit 111 to an occupied area ratio measurement unit 801.

The occupied area ratio measurement unit 801 calculates a ratio of the measurement target virtual object 204 occupying the screen of the display unit 112 (hereinafter referred to as the occupied area ratio to the screen) from the captured image acquired via the image acquisition unit 104 and each virtual object including the measurement target virtual object 204 generated in the virtual object generation unit 102. The occupied area ratio measurement unit 801 measures the occupied area ratio to the screen using a publicly known method. For example, the occupied area ratio measurement unit 801 may measure the occupied area ratio to the screen based on the number of pixels of the measurement target virtual object 204 to the total number of pixels in the screen, or based on an area of the measurement target virtual object 204 to an area of the screen. In a case where the occupied area ratio of the measurement target virtual object 204 to the screen is higher than or equal to a predetermined occupied area ratio, the occupied area ratio measurement unit 801 notifies the display change unit 107 that the occupied area ratio of the measurement target virtual object 204 to the screen is higher than or equal to a predetermined occupied area ratio. That is, in a case where the occupied area ratio of the measurement target virtual object to the screen is high, the influence of the measurement target virtual object on the MR experiencing person 201 can be said to be large. For this reason, in the third exemplary embodiment, in a case where the occupied area ratio of the measurement target virtual object to the screen is higher than or equal to the predetermined occupied area ratio threshold, the occupied area ratio measurement unit 801 notifies the display change unit 107 that the occupied area ratio of the measurement target virtual object to the screen is higher than or equal to the predetermined occupied area ratio threshold.

Upon reception of the notification, the display change unit 107 in the third exemplary embodiment then changes the method of displaying the measurement target virtual object 204 in the combined image generation unit 108. The change of the display method is similar to that of the example of the first exemplary embodiment.

Figure 9:
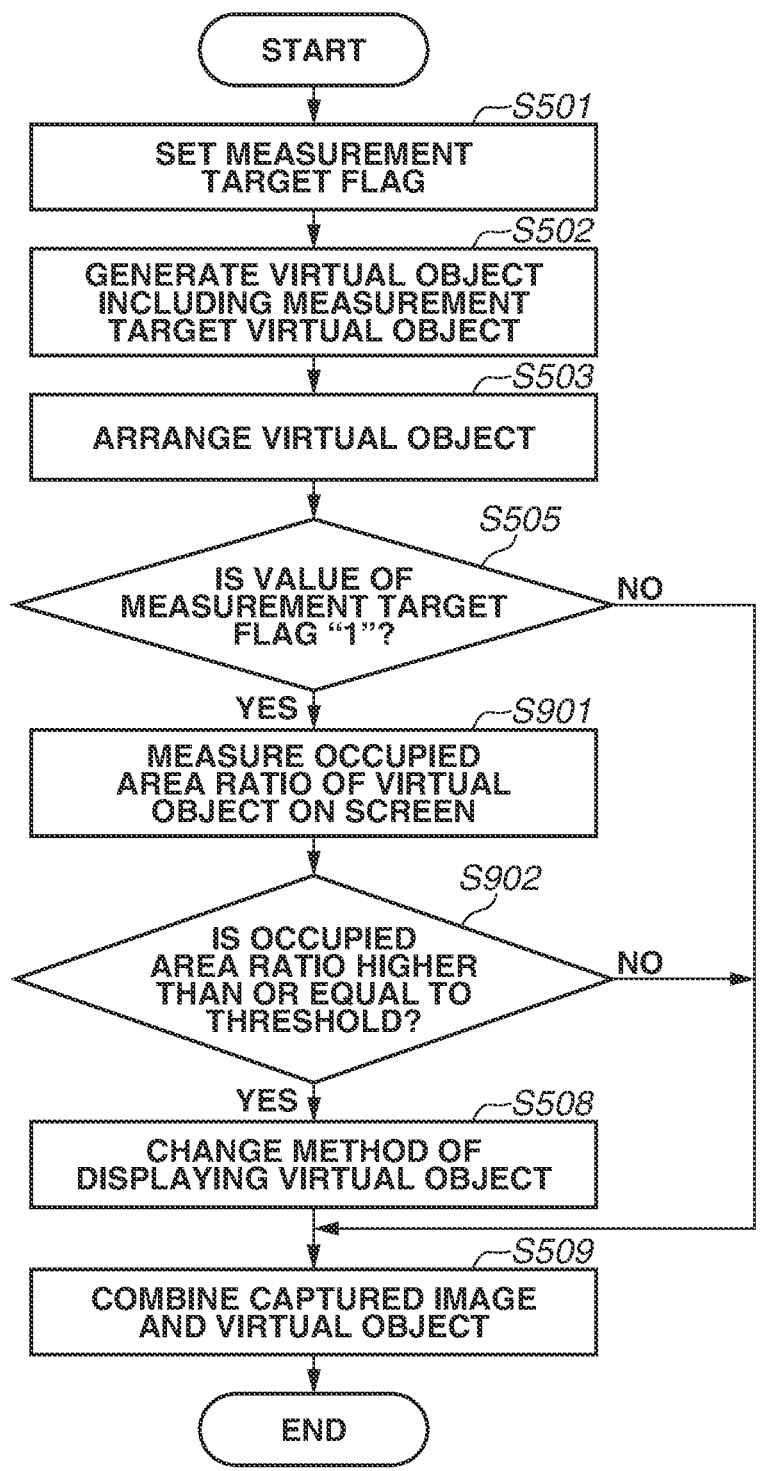
FIG. 9 is a flowchart describing a flow of information processing according to one or more aspects of the present disclosure.

FIG. 9 is a flowchart illustrating a flow of information processing to be performed by the information processing apparatus 800 according to the third exemplary embodiment. In the flowchart of FIG. 9, the same processing steps as those in the flowchart of FIG. 5 described above are denoted by the same reference signs as those in FIG. 5, and a description thereof is omitted as appropriate. The processing from step S501 to step S503 is similar to that described above. In the third exemplary embodiment, after the processing in step S503, the processing proceeds to step S505. In a case where the value of the measurement target flag is not "1" (NO in step S505), the processing proceeds to step S509. In contrast, in a case where the value of the measurement target flag is "1" (YES in step S505), the processing proceeds to step S901.

In step S901, the occupied area ratio measurement unit 801 measures the occupied area ratio of the measurement target virtual object 204 to the screen of the display unit 112, and adds information about the occupied area ratio to the screen to the data about the measurement target virtual object 204.

Subsequently in step S902, the occupied area ratio measurement unit determines whether or not the occupied area ratio to the screen measured in step S901 is higher than or equal to a predetermined occupied area ratio threshold. In a case where the occupied area ratio measurement unit 801 determines that the occupied area ratio to the screen is higher than or equal to the occupied area ratio threshold (YES in step S902), the occupied area ratio measurement unit 801 notifies the display change unit 107 that the occupied area ratio to the screen is higher than or equal to the occupied area ratio threshold, and thereafter the processing to be performed the information processing apparatus 800 proceeds to step S508. In contrast, in a case where the occupied area ratio measurement unit 801 determines that the occupied area ratio to the screen is below the occupied area ratio threshold (NO in step S902), the processing to be performed by the information processing apparatus 800 proceeds to step S509. The processing in steps S508 and S509 is similar to that described above.

As described above, in the third exemplary embodiment, in a case where the occupied area ratio of the measurement target virtual object to the screen of the display unit 112 of the imaging display apparatus 110 is higher than or equal to the predetermined occupied area ratio threshold, the method of displaying the measurement target virtual object can be changed. With this configuration, according to the third exemplary embodiment, the MR experience can be prevented from being inhibited by the virtual object whose movement cannot be predicted by the MR experiencing person by himself/herself.

Modification Example of Third Exemplary Embodiment

While the example of determining whether not to change the method of displaying the virtual object based on the occupied area ratio to the screen, which is the ratio of the measurement target virtual object occupying the screen, has been described, a change amount of the occupied area ratio to the screen, instead of an absolute amount of the occupied area ratio to the screen, may be used as a condition for determining whether or not to change the display method as a modification example.

In this modification example, the occupied area ratio measurement unit 801 calculates the change amount of the occupied area ratio of the measurement target virtual object 204 to the screen from a difference between an occupied area ratio to the screen in the previous frame and an occupied area ratio to the screen in the current frame. In a case where the change amount of the occupied area ratio to the screen is larger than or equal to a predetermined change amount threshold, the occupied area ratio measurement unit 801 notifies the display change unit 107 that the change amount of the occupied area ratio to the screen is larger than or equal to a predetermined change amount threshold. For example, in a case where the occupied area ratio to the screen in the current frame becomes higher than the occupied area ratio to the screen in the previous frame and a change amount of the occupied area ratio to the screen at this time becomes larger than or equal to the predetermined change amount threshold, the occupied area ratio measurement unit 801 notifies the display change unit 107 that the occupied area ratio to the screen in the current frame becomes higher than the occupied area ratio to the screen in the previous frame and that a change amount of the occupied area ratio to the screen at this time becomes larger than or equal to the predetermined change amount threshold. On the contrary, in a case where the occupied area ratio to the screen in the current frame becomes lower than the occupied area ratio to the screen in the previous frame and the change amount of the occupied area ratio to the screen at this time becomes larger than or equal to the predetermined change amount threshold, the occupied area ratio measurement unit 801 may notify the display change unit that the occupied area ratio to the screen in the current frame becomes lower than the occupied area ratio to the screen in the previous frame and that the change amount of the occupied area ratio to the screen at this time becomes larger than or equal to the predetermined change amount threshold. In terms of preventing the MR experience from being inhibited by the virtual object whose movement cannot be predicted by the MR experiencing person, it is preferable that the occupied area ratio measurement unit 801 notify the display change unit 107 in a case where the change amount becomes larger than or equal to the predetermined change amount when the occupied area ratio to the screen in the current frame is higher than the occupied area ratio to the screen in the previous frame. In other words, in a case where the measurement target virtual object approaches the MR experiencing person 201, the occupied area ratio of the measurement target virtual object to the screen becomes higher. Thus, the occupied area ratio measurement unit 801 is configured to notify the display change unit 107 when the change amount of the occupied area ratio to the screen at this time becomes larger than or equal to the change amount threshold. Upon reception of such a notification, the display change unit 107 changes the method of displaying the measurement target virtual object in a similar manner to that described above.

According to the modification example of the third exemplary embodiment, in a case where the occupied area ratio of the measurement target virtual object to the screen varies significantly, the method of displaying the measurement target virtual object can be changed. With this configuration, also in the modification example of the third exemplary embodiment, the MR experience can be prevented from being inhibited by the virtual object whose movement cannot be predicted by the MR experiencing person by himself/herself.

Hardware Configuration Example

Figure 10:
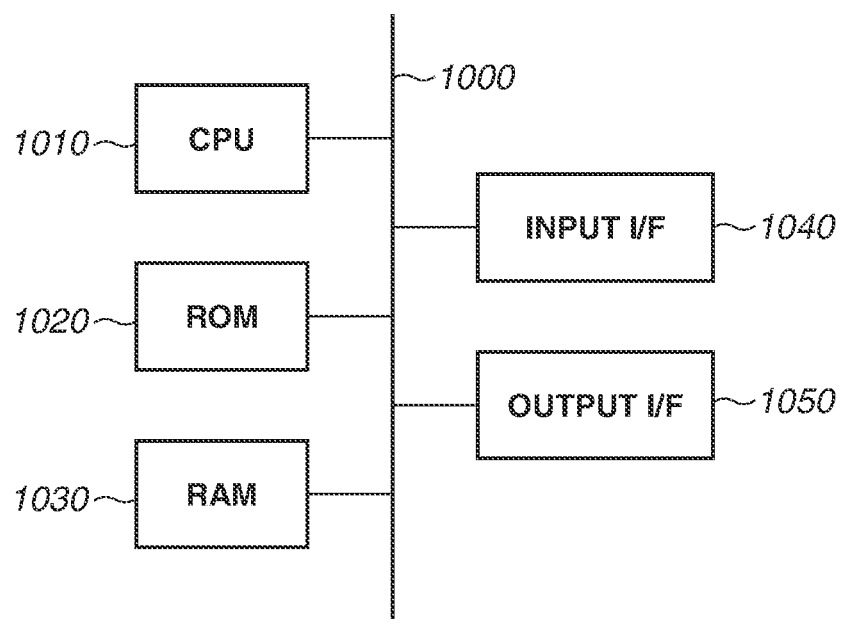
FIG. 10 is a diagram illustrating an example of a hardware configuration that enables implementation of the information processing apparatus.

FIG. 10 is a diagram illustrating an example of a hardware configuration that enables implementation of the information processing apparatus according to each of the exemplary embodiments described above.

In FIG. 10, a central processing unit (CPU) 1010 performs centralized control over each of devices connected via a bus 1000. The CPU 1010 reads out and executes processing steps and a program stored in a read-only memory (ROM) 1020. Each information processing program, each device driver, or the like according to the exemplary embodiments including an operating system (OS) is stored in the ROM 1020, temporarily stored in a random-access memory (RAM) 1030, and executed by the CPU 1010 as appropriate. In addition, an input interface (I/F) 1040 inputs signals from an external apparatus (for example, the imaging unit 111 of the imaging display apparatus 110 and an operation apparatus, which is not illustrated) in a format that can be processed by the information processing apparatus of each of the exemplary embodiments. Furthermore, an output I/F 1050 outputs signals in a format that can be processed by an external apparatus (for example, the display unit 112 of the imaging display apparatus 110). Each of these function units can be implemented by the CPU 1010 loading a program stored in the ROM 1020 to the RAM 1030, and executing the processing following the flowchart according to each of the exemplary embodiments described above. For example, in a case of configuring hardware in substitution for software processing using the CPU 1010, it is only required to configure an arithmetic unit or a circuit that can perform processing corresponding to processing to be performed by each function unit described herein.

Alternatively, all of the function units of the information processing apparatus according to each of the exemplary embodiments described above may be implemented by hardware, or some of them may be implemented by software. In a case of implementation by software, the software is implemented using the CPU 1010, the ROM 1020, the RAM 1030, and the like illustrated in FIG. 9.

While the exemplary embodiments of the present disclosure have been described above, the present disclosure is not limited to these particular exemplary embodiments, and includes various embodiments without departing from the gist of the present disclosure. Part of each exemplary embodiment described above can be combined as appropriate.

For example, while whether or not to change the method of displaying the measurement target virtual object is determined using any one of the distance, the angle, the speed, the occupied area ratio to the screen, and the like in the first to third exemplary embodiments, whether or not to change the display method may be determined based on a combination of two or more of the distance, the angle, the speed, the occupied area ratio to the screen, and the like.

In the above description, the imaging display apparatus 110 is the HMD that is mounted on the head of the MR experiencing person and in which the imaging unit 111 and the display unit 112 are arranged in the vicinity of the eyes of the MR experiencing person. However, the physical arrangement of the imaging display apparatus 110 is not specifically limited, and the imaging display apparatus 110 may be, for example, a handheld-type apparatus such as a tablet and a smartphone.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-031845, filed Feb. 27, 2020, which is hereby incorporated by reference herein in its entirety.

What is claimed is:
1. An information processing apparatus, comprising:
one or more processors; and
one or more memories coupled to the one or more processors, the one or more memories having stored thereon instructions which, when executed by the one or more processors, cause the apparatus to:
acquire a position of a display apparatus capable of displaying one or more virtual objects;
acquire a position of a target virtual object out of the one or more virtual objects;
measure a distance between the display apparatus and the target virtual object based on the position of the display apparatus and the position of the target virtual object; and
determine a degree of transparency of the target virtual object to be displayed on the display apparatus based on the distance between the display apparatus and the target virtual object; and
change the degree of transparency of the target virtual object to make the target virtual object transparent in a case where the distance becomes smaller than or equal to a predetermined distance threshold.

2. The information processing apparatus according to claim 1,
wherein the predetermined distance threshold includes a plurality of different distance thresholds, and
wherein the degree of transparency of the target virtual object is changed every time the distance becomes smaller than or equal to any one of the plurality of different distance thresholds.

3. The information processing apparatus according to claim 1, instructions, when executed by the one or more processors, further cause the apparatus to set the target virtual object.

4. The information processing apparatus according to claim 3, wherein a virtual object designated by a user or a virtual object having an area that is larger than or equal to a predetermined size is set as the target virtual object.

5. The information processing apparatus according to claim 3, wherein the instructions, when executed by the one or more processors, further cause the apparatus to set a predetermined attribute indicating a target of a change of the degree of transparency of the target virtual object to the target virtual object.

6. The information processing apparatus according to claim 1, wherein the instructions, when executed by the one or more processors, further cause the apparatus to display a combined image generated by combining the one or more virtual objects with a captured image of a real space on the display apparatus.

7. The information processing apparatus according to claim 1, wherein, in the case where the distance becomes smaller than or equal to the predetermined distance threshold, the target virtual object is made transparent even when no virtual object exists between the display device and the target virtual object.

8. An information processing apparatus, comprising:
one or more processors; and
one or more memories coupled to the one or more processors, the one or more memories having stored thereon instructions which, when executed by the one or more processors, cause the apparatus to:
calculate a ratio of a target virtual object occupying a screen of a display apparatus as an occupied area ratio;
determine an appearance of the target virtual object to be displayed on the display apparatus based on the calculated occupied area ratio; and
acquire a change amount of the occupied area ratio of the target virtual object,
wherein the appearance of the target virtual object is changed in a case where a change amount of the occupied area ratio is larger than or equal to a change amount threshold.

9. The information processing apparatus according to claim 8, wherein the appearance of the target virtual object is changed in a case where the occupied area ratio is higher than or equal to an occupied area ratio threshold.

10. An information processing method, comprising:
acquiring a position of a display apparatus capable of displaying one or more virtual objects;
acquiring a position of a target virtual object out of the one or more virtual objects;
measuring a distance between the display apparatus and the target virtual object based on the position of the display apparatus and the position of the target virtual object; and
determining a degree of transparency of the target virtual object to be displayed on the display apparatus based on the distance between the display apparatus and the target virtual object; and
changing the degree of transparency of the target virtual object to make the target virtual object transparent in a case where the distance becomes smaller than or equal to a predetermined distance threshold.

11. A non-transitory computer-readable storage medium that stores a program causing a computer to execute an information processing method, the method comprising:
acquiring a position of a display apparatus capable of displaying one or more virtual objects;
acquiring a position of a target virtual object out of the one or more virtual objects;
measuring a distance between the display apparatus and the target virtual object based on the position of the display apparatus and the position of the target virtual object; and
determining a degree of transparency of the target virtual object to be displayed on the display apparatus based on the distance between the display apparatus and the target virtual object; and
changing the degree of transparency of the target virtual object to make the target virtual object transparent in a case where the distance becomes smaller than or equal to a predetermined distance threshold.

12. An information processing method, comprising:
calculating a ratio of a target virtual object occupying a screen of a display apparatus as an occupied area ratio;
determining an appearance of the target virtual object to be displayed on the display apparatus based on the calculated occupied area ratio; and
acquiring a change amount of the occupied area ratio of the target virtual object,
wherein the appearance of the target virtual object is changed in a case where a change amount of the occupied area ratio is larger than or equal to a change amount threshold.

13. A non-transitory computer-readable storage medium that stores a program causing a computer to execute an information processing method, the method comprising:
calculating a ratio of a target virtual object occupying a screen of a display apparatus as an occupied area ratio;
determining an appearance of the target virtual object to be displayed on the display apparatus based on the calculated occupied area ratio; and
acquiring a change amount of the occupied area ratio of the target virtual object,
wherein the appearance of the target virtual object is changed in a case where a change amount of the occupied area ratio is larger than or equal to a change amount threshold.

* * * * *